March 19, 1940.                    G. M. DEMING                    2,194,420
                            LARGE-CAPACITY REGULATOR
                    Filed June 29, 1936              2 Sheets-Sheet 1

INVENTOR
George M. Deming
BY J. F. Brandenburg
ATTORNEY

March 19, 1940.  G. M. DEMING  2,194,420
LARGE-CAPACITY REGULATOR
Filed June 29, 1936   2 Sheets-Sheet 2

INVENTOR
George M. Deming
BY
J. F. Brandenburg
ATTORNEY

Patented Mar. 19, 1940

2,194,420

UNITED STATES PATENT OFFICE 2,194,420

LARGE-CAPACITY REGULATOR

George M. Deming, East Orange, N. J., assignor to Air Reduction Company, Incorporated, New York, N. Y., a corporation of New York Application June 29, 1936, Serial No. 87,855

9 Claims. (Cl. 50—11)

This invention relates to regulators, and particularly to a construction for regulators of large capacity.

It is an object of the invention to provide an improved regulator which has a very high quality of regulation, and which is of a construction suitable for regulators of larger capacity than those of the prior art. A regulator embodying this invention has been made with a capacity of 50,000 cu. ft. per hour without impairing the regulation quality or requiring unduly large or expensive apparatus.

Another object of the invention is to provide an improved regulator of the pilot-controlled type in which the movement of the diaphragm is effected entirely by gas pressure so that the usual errors resulting from spring stiffness are entirely eliminated.

In the design of any pressure regulator the size of the diaphragm relative to that of the nozzle is one of the most important fundamental considerations. In general, the larger the ratio, the more perfect the pressure regulation. However, large diaphragms necessarily entail much larger regulator bodies, with proportionately thicker walls and stronger mechanical means of assembly, so that the regulators are of excessive size and cost.

The effect of a larger diaphragm can be obtained by using a lever to transmit the diaphragm movements to the valve seat with the long end of the lever cooperating with the diaphragm so that relatively small changes in the reactions against the diaphragm will compensate much larger variations in the high-pressure gas reaction against the valve seat. With such a construction relatively small variations in delivery pressure result from very considerable variations in the pressure of the gas entering the regulator and thrusting against the valve seat.

In the usual spring and diaphragm type of regulator it has not been feasible to use levers having the diaphragm-connected arm much longer than the arm operating the valve seat. Although a large lever ratio results in smaller changes of the force at the long end of the lever corresponding to large changes at the short end, it also results in large movements of the long end of the lever corresponding to small movements of the short end of the lever. If relatively small variations in seat displacement cause large movements of the diaphragm, the pressure regulation is impaired because the large movements of the diaphragm necessarily involve very considerable changes in spring reaction, even when the adjusting spring which reacts against the diaphragm is designed as "soft" as possible.

With the pilot-controlled regulator of the invention it is unnecessary to make allowance for any spring stiffness since the diaphragm is moved entirely by gas pressure. Consequently, it is possible to make use of a much larger lever ratio than otherwise.

With large diaphragm movement, however, there is the important consideration of diaphragm stiffness. By combining a bellied diaphragm with a lever type regulator having no compensating spring, a very high quality of regulation is obtained without making the regulator of excessive size. It may be said that another object of the invention is to construct a regulator having a relation of elements which obtain high quality of regulation with gas flows which are large in proportion to the size of the regulator.

Other features of the invention include the protection of the diaphragm and valve seat from excessive pressures, a novel damping device which automatically becomes ineffective at low pressures, and measuring apparatus by which a simple flow gauge effectively indicates the delivery rate up to the full capacity of the regulator.

Other features, objects and advantages of the invention will be pointed out as the specification proceeds.

In the accompanying drawings, forming part hereof:

Fig. 3 is a reduced fragmentary view of the gauge board and flow selector indicating mechanism.

Figure 1:
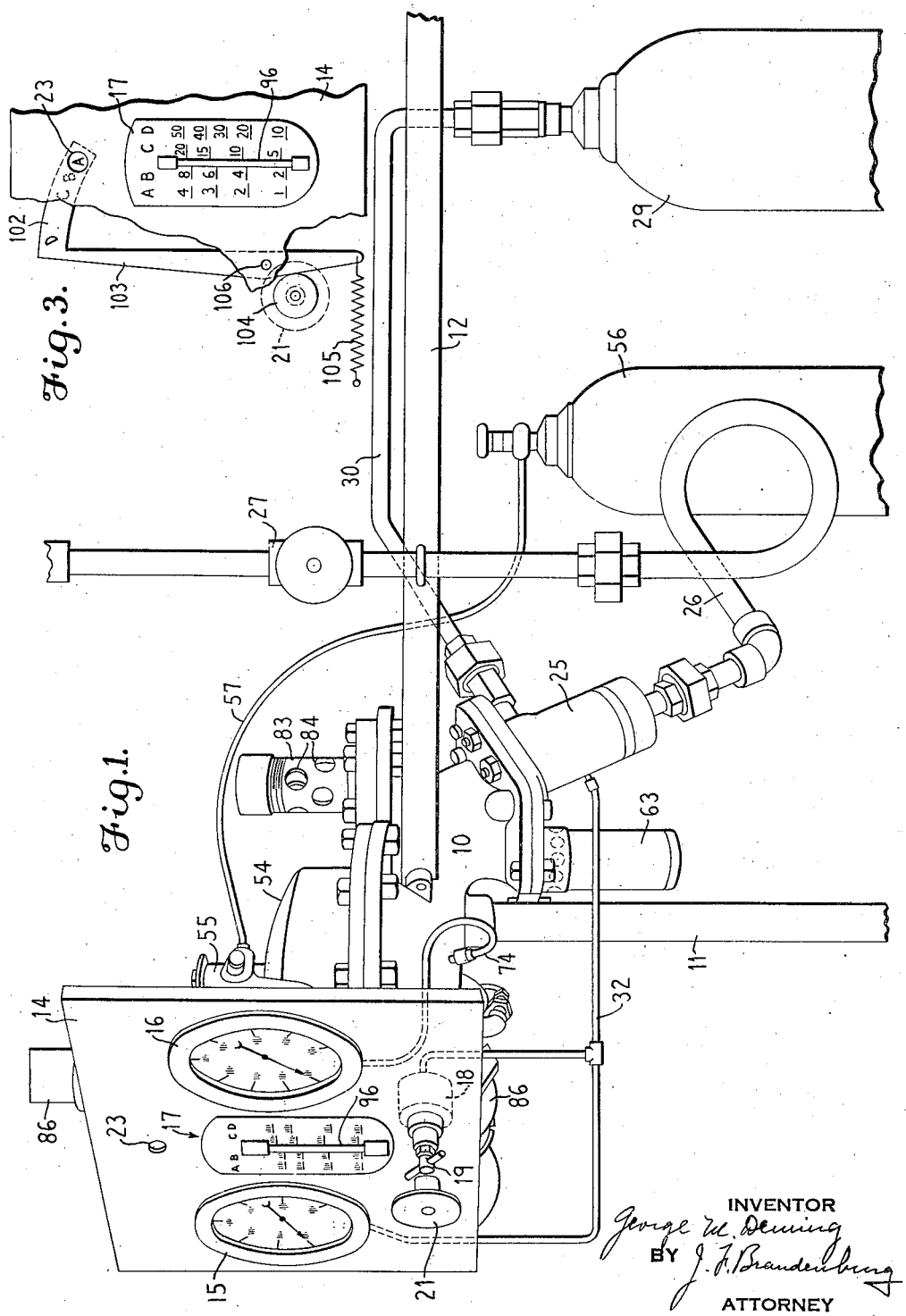
Fig. 1 is a perspective view of a regulator embodying the invention.

The main regulator includes a main body portion 10 supported from the floor by a stand 11 and fastened to the wall by braces 12. A gauge board 14 is connected to the body portion 10 and supports a high-pressure gauge 15 which indicates the inlet pressure, a low-pressure gauge 16 which indicates the delivery pressure of the regulator, a flow gauge 17, and a pilot regulator 18 having an adjusting screw 19 which extends through to the front of the gauge board. A hand wheel 21 is also located in front of the gauge board and has a shaft running through the board and into the body portion of the regulator to adjust the position of a plug controlling the flow gauge by-pass. There is a window 23 in the gauge board. A flag or plate behind the gauge board is moved past the window 23 when the hand wheel 21 is turned, and letters on the plate move into position where they can be viewed through the window. The flow gauge 17 has four scales, designated by the letters A, B, C and D, respectively. These letters correspond with the letters which come into view at the window 23 and an observer uses the flow gauge scale corresponding to the letter which shows at the window at the time when the reading of the gauge is taken.

An inlet conduit comprising a filter housing 25 is bolted to the body portion of the main regulator. High-pressure gas is supplied to the regulator through a pipe 26, which connects with the lower end of the filter housing 25. A valve 27 in the pipe 26 can be used to shut off the supply of gas. A vessel 29 of large capacity communicates with the filter housing 25 through a tube 30. This vessel is a dead-end chamber for receiving the heated gas which results from the compression wave when gas is suddenly admitted into the regulator. The vessel 29 is preferably a gas storage cylinder.

The high-pressure gauge 15 and pilot regulator 18 communicate with the filter housing 25 through tubing 32. The pilot regulator is preferably of the inverse type and the main regulator of the direct type.

Figure 2:
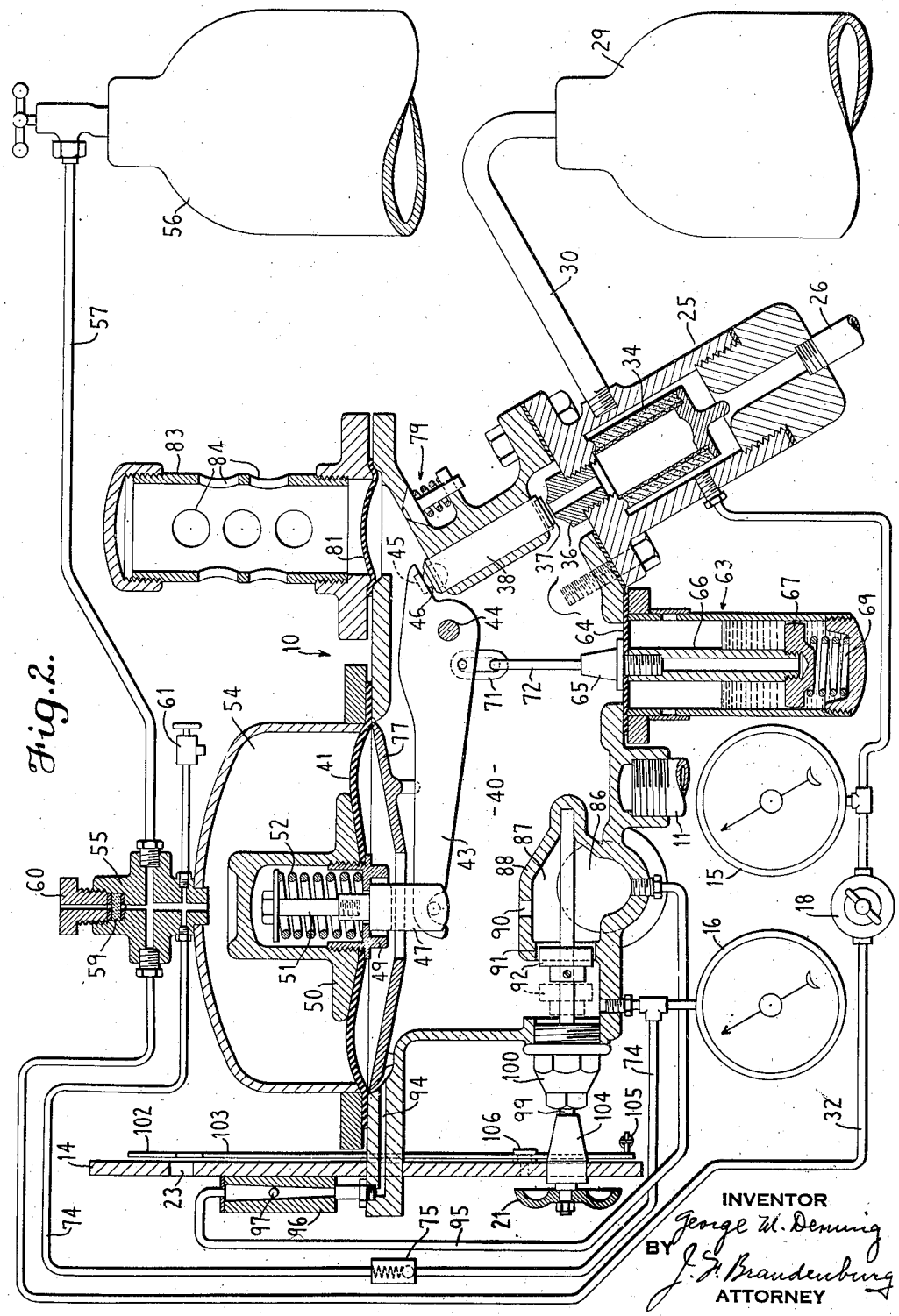
Fig. 2 is a schematic view of the regulator shown in Fig. 1, with most of the parts shown in section and the positions of certain parts shifted for clearer illustration.

Referring to Fig. 2, a glass-wool filter 34 supported on a screen frame filters the gas on its way to a nozzle 36. A valve or valve seat 37 is attached to the lower end of a rod 38 which slides in a bearing on the inside wall of the main body portion 10. Gas discharges from the nozzle 36 into the reduced-pressure chamber 40, where it exerts pressure against one side of a diaphragm 41. The diaphragm has its edge clamped between connected parts of the main body portion, and is of the bellied type so that it has a large range of movement.

The force of the gas against the diaphragm 41 is transmitted to the valve seat 37 through a lever 43 fulcrumed on a shaft 44 near the upper end of the rod 38. A hard insert 45 in the lever contacts with a spherical bearing 46 at the top of the rod 38. The long end of the lever 43 hooks over a stirrup 47 attached to the diaphragm 41. In the regulator shown in the drawings, the long arm of the lever 43 is five times the length of the short arm.

The connection between the stirrup 47 and diaphragm 41 is constructed so that it can yield in case an excessive pressure under the diaphragm develops a closing force likely to damage the valve seat 37 by pressing it against the nozzle with too much force. A flanged bushing 49 extends through an opening in the center of the diaphragm and threads into a back-casting 50, the inner edge of the diaphragm being clamped between the flange and the casting. A screw 51 which extends upward from the stirrup 47 compresses a spring 52 against a shoulder in the bushing so that the spring is permanently loaded. The stirrup is thus held firmly against the bushing, which is rigidly clamped to the diaphragm, but the spring 52 is designed to yield and let the bushing rise without lifting the stirrup further if the pull of the stirrup on the lever 43 becomes so great that the valve seat is likely to be damaged. The upward movement of the back-casting 50 is limited by an abutment at the upper end of the casting which comes into contact with the top wall of the control chamber.

The effective pressure against the diaphragm 41 is not the absolute gas pressure in the chamber 40, but the amount by which the gas pressure in that chamber exceeds the gas pressure in a control chamber 54 on the upper side of the diaphragm 41. Gas is supplied from the pilot regulator 18 to the control chamber 54 through a fitting 55.

When the diaphragm 41 rises as the result of an increase in the valve seat displacement with large rates of demand, the volume of the control chamber 54 is reduced by an amount equal to the displacement of the diaphragm. If this change in the size of the chamber 54 caused the gas pressure in the chamber to rise, there would be a change in the delivery pressure of the regulator. This is prevented by means of a cylinder 56 which communicates with the control chamber 54 through the fitting 55 and a tube 57. When the diaphragm rises it compresses the gas in both the chamber 54 and cylinder 56. The combined volume of the control chamber and cylinder is so large in comparison with the diaphragm displacement that the gas pressure rise in the chamber 54 is negligible.

In order that the delivery pressure of the regulator can be decreased when desired, it is necessary to provide for the escape of gas from the control chamber 54. This escape is also necessary to prevent slight leakage of the pilot regulator valve from building up the pressure in the control chamber 54 above the set delivery pressure of the pilot regulator. A bleed conduit including a porous ceramic diffuser plug 59 clamped in the fitting 55 by means of a bushing 60 permits gas to escape from the control chamber 54 into the atmosphere.

The amount of gas lost through the diffuser plug 59 is very small. The regulator shown in the drawings has a delivery rate of 50,000 cu. ft. per hour, and a flow of gas of ¼ cu. ft. per hour through the diffuser plug 59 has been found sufficient to take care of any reasonable valve leaks in the pilot regulator and to avoid any serious effects of hour-to-hour change in the temperature of the gas in the control chamber 54. When the main regulator is to be adjusted for a substantially lower delivery pressure, the gas pressure in the control chamber 54 can be reduced quickly by opening a needle valve 61 which controls an exhaust port from the fitting 55.

Hunting of the main regulator is prevented by a brake comprising a dash-pot 63. There is a diaphragm 64 across the top of the dash-pot, and the peripheral edge of the diaphragm is clamped between the upper end of the dash pot and the main body portion of the regulator. A cap 65 has a threaded end portion which extends through the center of the diaphragm 64 and is screwed into a sleeve 66. A flange on the cap 65 clamps the diaphragm 64 against the upper end of the sleeve 66.

The lower end of the sleeve 66 threads into a piston or plunger 67. The dash-pot is filled with glycerin to a level considerably above the plunger 67, and there is a spring 69 compressed between the plunger and the bottom of the dash-pot. This spring is of such strength that it holds the plunger 67 in a raised position when the pressure in the chamber 40 of the main regulator is atmospheric or only a few pounds above atmospheric. As the pressure in the chamber 40 rises, however, it creates a downward thrust upon the diaphragm 64 which overcomes the upward thrust of the spring 69.

A link 71 is attached to the lever 43. A hook 72 extends through the link 71 and is attached at its lower end to the cap 65. The link 71 is similar to a chain link and with the hook 72 provides a lost motion connection between the lever 43 and the plunger 67 of the dash-pot. During the ordinary operation of the regulator the hook 72 is held down, as far as the link 71 will permit, by gas pressure against the diaphragm 64 and the lost motion in the connection is not effective.

When the gas pressure in the chamber 40 is low and the plunger 67 held in a raised position by the spring 69, the hook 72 is above the lower end of the link 71 and the lever 43 can move without restraint from the dash-pot. In this way the regulator is made immediately responsive to the pressure rise caused when gas is initially admitted into the chamber 40 through the nozzle 36.

The chamber 40 communicates with the control chamber 54 through piping 74, but there is a spring-loaded relief valve 75 in the piping 74 and this valve does not let gas flow to the control chamber 54 unless the pressure in that chamber is much lower than the delivery pressure of the main regulator. By designing the valve 75 to open for a 25 lb. pressure, the diaphragm 41 can be protected from pressure differentials greater than 25 lbs. The valve 75 prevents any flow from the control chamber 54 toward the reduced-pressure chamber 40. The low-pressure gauge 16 is connected with the piping 74.

If gas is drawn from the main regulator after the bank of cylinders supplying the gas has been drained below the regulation end-point without another bank being cut in, the pressure below the diaphragm 41 may drop much faster than the pressure in the control chamber 54, with the result that there is an excessive downward pressure against the diaphragm. A casting 77 within the main body portion below the diaphragm 41 provides a support which limits the downward movement of the diaphragm and keeps it from being damaged in case the pressure in the control chamber 54 becomes excessively higher than that below the diaphragm.

If the regulator valve seat 37 develops any leaks of a minor nature, a pop relief-valve 79 prevents a serious rise in pressure within the chamber 40. In the event of a pressure rise of such proportions that the pop relief-valve 79 can not check the rise, a bursting disc 81 will rupture and permit the escape of gas from the chamber 40.

The port in the wall of the main body portion which is covered by the bursting disc 81 has a cross-sectional area at least ten times as great as that of the opening through the nozzle 36. An opening of such size provides for the escape of any gas that can enter through the nozzle 36 and without excessive pressure rise in the chamber 40.

The bursting disc 81 is held in place by clamping its peripheral edge between the main body portion 10 and a cage or guard 83. This guard protects the disc 81 from mechanical injury. The guard extends away from the main body portion far enough to obtain a large number of exhaust ports 84 so that broken remnants of a ruptured bursting disc can not impede the free discharge of gas through the guard 83.

The main regulator has a delivery conduit 86 which communicates with a chamber 87 in the main body portion 10. This chamber 87 is divided from the reduced-pressure chamber 40 by a partition 88. Gas flows from the chamber 40 to the chamber 87 by different routes, one of which is a port 90 through the partition 88. Another opening 91 through the partition 88 can be substantially closed by a flow-selector plug 92, but some gas flows from the chamber 40 to the chamber 87 through the clearance between the plug 92 and the opening 91.

A third passage for gas from chamber 40 to chamber 87 is the flow gauge by-pass. Gas flows to the inlet side of the flow gauge 17 through a conduit 94, which leads from the reduced-pressure chamber 40. The discharge side of the flow gauge communicates with the chamber 87 through a tube 95.

The amount of gas flowing to the delivery conduit 86 through the flow gauge by-pass can be controlled by moving the plug 92 out of the opening 91 for various distances. As this plug is moved toward the dotted-line position shown in Fig. 2 it permits the gas to flow through the opening 91 with less and less restriction. An increase in the amount of gas flowing through the opening 91 causes a decrease in the rate of flow through the conduit 94 and flow gauge 17. For every position of the flow-selector plug 92, a definite percentage of the total gas flow passes through the flow gauge.

The four scales A, B, C and D of the flow gauge 17 are graduated for four positions of the plug 92, so chosen that the ranges of the flow gauge scales overlap and the gauge is capable of indicating any rate of flow within the delivery range of the regulator.

The flow gauge 17 comprises a transparent tube 96 having a tapered bore, and an indicator ball 97 which is held at different elevations in the tube 96 by the gas flowing through the tube.

The flow-selector plug 92 is pinned to a shaft 99 which is threaded through a bonnet 100 on the main body portion of the regulator. The hand wheel 21 is attached to the outer end of the shaft 99. As the hand wheel 21 is turned to move the shaft 99 and plug 92 in or out, the position of the plug 92 is indicated by a flag 102 on the long end of a lever 103 which bears against a tapered collar 104 on the shaft 99. The lever 103 is supported by a pin 106 extending from the rear of the gauge board 14. This pin is the fulcrum of the lever 103, and the short end of the lever is held against the tapered collar 104 by a spring 106 anchored at one end to the gauge board 14, as shown in Fig. 3.

As the shaft 99 moves axially, the sloping surface of the collar 104 serves as a cam and imparts a progressive movement to the lever 103. Letters A, B, C and D on the flag 102 move into a center position behind the window 23 when the flow-selector plug 92 is in position to make each of the respective scales A, B, C and D of the flow gauge effective to indicate the rate of gas delivery from the main regulator.

The preferred embodiment of the invention has been described but changes and modifications can be made and some features of the invention may be used without others.

I claim:

1. The combination of a pilot regulator which receives gas at high pressure and delivers it at reduced pressure, a main regulator including a valve, a diaphragm in the main regulator moved entirely by gas pressure, said diaphragm forming a partition between the reduced-pressure chamber of the main regulator and a control-pressure chamber which communicates with the delivery side of the pilot regulator, and motion transmitting connections between the diaphragm and the valve including a lever and a fulcrum near the valve end of said lever so that large movements of the diaphragm cause relatively small movements of the valve.

2. A regulator comprising a reduced-pressure chamber, a valve for controlling the gas inlet to said chamber, a bellied diaphragm moved entirely by gas pressure and forming a partition across an opening in a wall of said chamber so that one side of said diaphragm is subject to the gas pressure in the chamber, a lever by which motion of the diaphragm is transmitted to the valve, a fulcrum near the valve end of the lever so that the diaphragm has a substantial mechanical advantage in operating the valve, a control chamber on the other side of the diaphragm, and a pilot regulator having a discharge orifice and a passage through which said discharge orifice communicates with the control chamber for supplying gas at a fixed pressure to said control chamber.

3. The combination with a main regulator having a valve operating diaphragm with one side subject to the reduced pressure in the main regulator and the other side subject to the gas pressure in a control-pressure chamber, and a pilot regulator which receives gas at high pressure and delivers it at reduced pressure to the control-pressure chamber, of a by-pass connecting the reduced-pressure chamber and control-pressure chamber, and means for preventing pressure in the reduced-pressure chamber of the main regulator from exceeding that in the control-pressure chamber by more than a predetermined value, said means including a relief valve in the by-pass loaded to prevent the passage of gas toward the control-pressure chamber, the valve loading being of such a nature that it yields to a gas pressure in excess of said predetermined value.

4. In a pressure regulator of the class wherein a diaphragm is exposed on one side to the gas pressure in a reduced-pressure chamber, and a valve is operated by motion-transmitting means operatively connected with the diaphragm to control the supply of gas to the reduced-pressure chamber, the combination with said motion-transmitting means of a device connected with said means to prevent hunting of the valve-operating mechanism, said device comprising a dash-pot having a cylinder, a piston, and a piston rod, a diaphragm separating the interior of the dash-pot cylinder from the reduced-pressure chamber, and means connecting this separating diaphragm and the piston rod where the piston rod passes through the diaphragm.

5. In a pressure regulator wherein a valve controls the supply of gas into a reduced-pressure chamber, and valve-operating means are actuated by gas pressure in the chamber, the combination with the valve-operating means of stabilizing apparatus including a brake located close to the reduced-pressure chamber, a diaphragm located between the brake and the reduced-pressure chamber and exposed on one side to the gas pressure in said chamber, a connection extending from the brake through said diaphragm to the valve-operating means, and means joining the diaphragm and said connection where the latter passes through the diaphragm.

6. In a pressure regulator of the class wherein a valve controls the supply of gas into a reduced pressure chamber, and the valve-operating means are actuated by gas pressure in said chamber, the combination with the valve-operating means of a brake connected with said valve-operating means to prevent hunting of said means, and apparatus responsive to the gas pressure in the reduced-pressure chamber for rendering the brake ineffective when the pressure in the chamber is below a given value.

7. A pressure regulator wherein a valve controls the supply of gas into a reduced-pressure chamber, and the valve is operated by means including a diaphragm exposed on one side to the gas pressure in said chamber, characterized by the fact that there is combined with the valve-operating means a damping device for preventing hunting of the valve-operating means, means for resisting the displacement of the damping device in one direction, and means connecting the damping device with the valve-operating means including a lost motion connection which permits the valve-operating means to move further toward its low-pressure position after movement of the damping device is stopped by said means for resisting the damping device displacement so that said damping device is ineffective when the pressure in said reduced pressure chamber is below a given value.

8. Apparatus for continuously indicating the flow of gas from the reduced-pressure chamber of a pressure regulator, said apparatus including a by-pass through which gas can flow from the chamber to the delivery line without passing through the discharge passage that connects the regulator directly to the delivery line, a flow gauge including a plurality of scales and an indicator which is moved along said scales by the flow of gas through the by-pass, and adjustable means that change the percentage of the total gas flow which passes through the by-pass and make the different scales effective.

9. A pressure regulator comprising a valve for controlling the admission of gas from a high-pressure source into a reduced-pressure chamber of the regulator, a diaphragm connected with the valve for operating the valve, a nozzle through which gas flows into the reduced-pressure chamber and toward and from which the valve is movable, a port in one wall of the reduced-pressure chamber, said port being of large enough cross-section to permit the escape of gas from the chamber as fast as it can enter through the nozzle and without any substantial pressure rise in the chamber, a bursting disc closing said port, and a perforated cage over the bursting disc to protect it from mechanical injury, the total area of the perforations of said cage being substantially larger than the sum of the cross-sectional area of the nozzle opening plus the area of the disc so that fragments of a ruptured disc can not prevent the free escape of gas through said cage.

GEORGE M. DEMING.